United States Patent
Sakellarides

(10) Patent No.: US 9,656,447 B2
(45) Date of Patent: May 23, 2017

(54) LIDDING STRUCTURE BASED ON AROMATIC POLYESTER FILM, EXTRUSION-COATED WITH A SEALABLE/PEELABLE COPOLYESTER LAYER

(75) Inventor: Stefanos L Sakellarides, East Greenwich, RI (US)

(73) Assignee: TORAY PLASTICS (AMERICA), INC., North Kingstown, RI (US)

(*) Notice: Subject to any disclaimer, the term of this patent is extended or adjusted under 35 U.S.C. 154(b) by 796 days.

(21) Appl. No.: 13/601,100

(22) Filed: Aug. 31, 2012

(65) Prior Publication Data

US 2014/0065431 A1   Mar. 6, 2014

(51) Int. Cl.
*B32B 7/02*     (2006.01)
*B32B 27/08*    (2006.01)
*B32B 27/20*    (2006.01)
*B32B 27/36*    (2006.01)
*B32B 37/15*    (2006.01)
(Continued)

(52) U.S. Cl.
CPC .......... *B32B 27/36* (2013.01); *B32B 7/06* (2013.01); *B32B 27/08* (2013.01); *B05D 1/265* (2013.01); *B29C 47/06* (2013.01); *B32B 7/02* (2013.01); *B32B 27/20* (2013.01); *B32B 37/153* (2013.01); *B32B 2250/02* (2013.01); *B32B 2250/03* (2013.01); *B32B 2250/244* (2013.01); *B32B 2307/31* (2013.01); *B32B 2307/702* (2013.01); *B32B 2307/704* (2013.01); *B32B 2367/00* (2013.01); *B32B 2435/02* (2013.01); *C08G 63/16* (2013.01); *C08G 63/18* (2013.01); *C08G 63/183* (2013.01); *C08K 3/38* (2013.01); *C08L 67/02* (2013.01); *C08L 67/03* (2013.01); *C09J 167/02* (2013.01); *C09J 167/03* (2013.01); *C09J 2467/006* (2013.01); *Y10T 428/2817* (2015.01);
(Continued)

(58) Field of Classification Search
None
See application file for complete search history.

(56) References Cited

U.S. PATENT DOCUMENTS 4,373,002 A * 2/1983 Petersen-Hoj ............... 428/213
4,375,494 A * 3/1983 Stokes ........................ 428/323
(Continued)

FOREIGN PATENT DOCUMENTS

JP   05-214228   *  8/1993
JP   08-118537   *  5/1996
WO   96/19333       6/1996

*Primary Examiner* — Vivian Chen
(74) *Attorney, Agent, or Firm* — Pillsbury Winthrop Shaw Pittman LLP

(57) ABSTRACT

A multi-layer sheet suitable as sealable or peelable sheet specially used for closing foodstuff containers. This multi-layer sheet comprises a polymeric substrate layer and a seal or a peel-seal layer. The multilayer composite film has at least two main component layers, namely in order, a polymeric substrate layer for mechanical strength and a heat-sealable layer applied by extrusion-coating, comprising a polyester of at least one aromatic dicarboxylic acid and at least one aliphatic dicarboxylic acid and at least one aliphatic diol. The polyester substrate layer comprises a crystallizable polyester base layer and an amorphous polyester sealable skin layer. The heat-sealable layer is slow-crystallizing with a glass transition temperature 50° F. or lower and melting point 250-320° F.

20 Claims, 12 Drawing Sheets

Structures of two- and three-layer lidding films

(51) Int. Cl.
  *C09J 167/02* (2006.01)
  *C09J 167/03* (2006.01)
  *C08G 63/16* (2006.01)
  *C08G 63/18* (2006.01)
  *C08G 63/183* (2006.01)
  *B05D 1/26* (2006.01)
  *B29C 47/06* (2006.01)
  *C08K 3/38* (2006.01)
  *C08L 67/02* (2006.01)
  *C08L 67/03* (2006.01)
  *B32B 7/06* (2006.01)

(52) U.S. Cl.
  CPC .. *Y10T 428/2826* (2015.01); *Y10T 428/31786* (2015.04)

(56) References Cited

U.S. PATENT DOCUMENTS

| | | | | |
|---|---|---|---|---|
| 5,540,868 A * | 7/1996 | Stouffer | ............... | C08G 63/80 264/13 |
| 5,629,060 A * | 5/1997 | Garwood | ............... | 428/35.2 |
| 5,643,991 A * | 7/1997 | Stipe et al. | ............... | 524/496 |
| 5,852,164 A * | 12/1998 | Akai et al. | ............... | 528/279 |
| 5,888,599 A * | 3/1999 | Bradt | ............... | B32B 27/08 156/308.4 |
| 5,888,648 A * | 3/1999 | Donovan | ............... | B32B 7/06 428/347 |
| 6,939,584 B2 | 9/2005 | Sankey | | |
| 7,141,293 B2 | 11/2006 | Peiffer | | |
| 7,205,040 B2 * | 4/2007 | Peiffer et al. | ............... | 428/141 |
| 7,329,453 B2 | 2/2008 | Peiffer | | |
| 7,422,782 B2 * | 9/2008 | Haedt | ............... | B32B 7/06 428/213 |
| 7,442,427 B2 * | 10/2008 | Peiffer et al. | ............... | 428/141 |
| 7,521,103 B2 | 4/2009 | Posey | | |
| 7,655,291 B2 | 2/2010 | Ye | | |
| 7,824,749 B2 * | 11/2010 | Dawes | ............... | B32B 27/36 206/484.2 |
| 7,943,230 B2 | 5/2011 | Imai | | |
| 8,133,592 B2 | 3/2012 | Takada | | |
| 8,617,673 B1 * | 12/2013 | Desai et al. | ............... | 428/35.7 |
| 2001/0012557 A1 * | 8/2001 | Willham et al. | ............... | 428/215 |
| 2002/0012807 A1 * | 1/2002 | Kurian et al. | ............... | 428/480 |
| 2002/0127362 A1 * | 9/2002 | Jansen et al. | ............... | 428/40.1 |
| 2004/0052993 A1 * | 3/2004 | Dawes | ............... | 428/35.7 |
| 2004/0067284 A1 | 4/2004 | Sankey et al. | ............... | 426/106 |
| 2004/0213966 A1 * | 10/2004 | Peiffer et al. | ............... | 428/202 |
| 2004/0213967 A1 * | 10/2004 | Peiffer et al. | ............... | 428/202 |
| 2004/0229060 A1 * | 11/2004 | Peiffer et al. | ............... | 428/483 |
| 2005/0019559 A1 * | 1/2005 | Peiffer et al. | ............... | 428/336 |
| 2005/0042439 A1 * | 2/2005 | Peiffer et al. | ............... | 428/323 |
| 2005/0042441 A1 * | 2/2005 | Peiffer et al. | ............... | 428/336 |
| 2005/0061708 A1 * | 3/2005 | Peiffer et al. | ............... | 206/557 |
| 2005/0074619 A1 * | 4/2005 | Peiffer et al. | ............... | 428/480 |
| 2005/0100750 A1 * | 5/2005 | Peiffer et al. | ............... | 428/482 |
| 2005/0106342 A1 * | 5/2005 | Dawes et al. | ............... | 428/34.9 |
| 2005/0208282 A1 * | 9/2005 | Wood et al. | ............... | 428/216 |
| 2006/0094858 A1 * | 5/2006 | Turner et al. | ............... | 528/272 |
| 2006/0275601 A1 * | 12/2006 | Suzuki et al. | ............... | 428/339 |
| 2007/0287017 A1 * | 12/2007 | Sargeant et al. | ............... | 428/480 |
| 2008/0193783 A1 | 8/2008 | Imai | | |
| 2009/0022919 A1 * | 1/2009 | Chicarella et al. | ............... | 428/35.9 |
| 2009/0130276 A1 * | 5/2009 | Voisin | ............... | B32B 27/08 426/415 |
| 2009/0240024 A1 | 9/2009 | Kim | | |
| 2009/0278293 A1 * | 11/2009 | Yoshinaka | ............... | C08K 3/34 267/140.11 |
| 2010/0003377 A1 * | 1/2010 | Brennan et al. | ............... | 426/106 |
| 2010/0068355 A1 * | 3/2010 | Berry | ............... | B32B 1/02 426/125 |
| 2010/0112251 A1 * | 5/2010 | Shelby | ............... | C09J 167/02 428/35.7 |
| 2011/0077339 A1 | 3/2011 | Kim | | |
| 2011/0081530 A1 * | 4/2011 | Robinson et al. | ............... | 428/212 |
| 2011/0236706 A1 | 9/2011 | Uebayashi | | |
| 2012/0128956 A1 | 5/2012 | Takatsu | | |
| 2014/0127515 A1 * | 5/2014 | Sakellarides | ............... | 428/413 |

* cited by examiner

Figure 5A: List of peaks and possible group assignments in FTIR spectrum for Griltex™ D 1939E

| Peak Wavenumber, cm$^{-1}$ | Group Assignment | Comments |
|---|---|---|
| 3200-3600 (broad band) | O-H stretch | Mainly from residual moisture (water) |
| 2919.3, 2850.7 | C-H stretch | Methylene groups present in diol or diacid |
| 2362.0 | Unidendified | |
| 1712.1 | C=O (carbonyl) stretch | Consistent with presence of ester groups |
| 1504.2, 1456.2, 1409.0 | Aromatic C=C | Terephthalic or isophthalic rings as there are confirming aromatic C-H peaks slightly above 3000 |
| 1266.9, 1246.9 | (C=O)-O vibration | Consistent with the presence of ester groups |
| 1168.5, 1117.1, 1101.5, 1017.6, 936.6, 873.0, 725.9 | Unidentified | Fingerprint section; Interpretation of peaks in the fingerprint region is complicated by the large number of different vibrations that occur here. These include single bond stretches and a wide variety of bending vibrations. This region gets its name since nearly all molecules (even very similar ones) have a unique pattern of absorptions in this region. |

Figure 5B: List of peaks and possible group assignments in FTIR spectrum for Griltex™ 6E

| Peak Wavenumber, cm$^{-1}$ | Group Assignment | Comments |
| --- | --- | --- |
| 3411.8 (broad peak) | O-H stretch | Mainly from residual moisture (water) |
| 2955.3, 2917.3, 2850.0 | C-H stretch | Methylene groups present in diol or diacid |
| 2361.9 | Unidendified | |
| 1712.4 | C=O (carbonyl) stretch | Consistent with presence of ester groups |
| 1504.0, 1464.3, 1408.1 | Aromatic C=C | Terephthalic or isophthalic rings as there are confirming aromatic C-H peaks slightly above 3000 |
| 1265.5, 1229.5 | (C=O)-O vibration | Consistent with the presence of ester groups |
| 1165.9, 1096.7, 1016.8, 937.5, 874.2, 723.9, 464.8 | Unidentified | Fingerprint section; Interpretation of peaks in the fingerprint region is complicated by the large number of different vibrations that occur here. These include single bond stretches and a wide variety of bending vibrations. This region gets its name since nearly all molecules (even very similar ones) have a unique pattern of absorptions in this region. |

Figure 5C: List of peaks and possible group assignments in FTIR spectrum for Griltex™ D 2274E

| Peak Wavenumber, cm$^{-1}$ | Group Assignment | Comments |
|---|---|---|
| 3200-3600 (broad band) | O-H stretch | Mainly from residual moisture (water) |
| 2917.2, 2849.9 | C-H stretch | Methylene groups present in diol or diacid |
| 2359.2 | Unidentified | |
| 1715.7 | C=O (carbonyl) stretch | Consistent with presence of ester groups |
| 1577.5, 1455.7, 1409.1 | Aromatic C=C | Terephthalic or isophthalic rings as there are confirming aromatic C-H peaks slightly above 3000 |
| 1243.8 | (C=O)-O vibration | Consistent with the presence of ester groups |
| 1165.4, 1094.5, 1016.8, 872.0, 723.9 | Unidentified | Fingerprint section; Interpretation of peaks in the fingerprint region is complicated by the large number of different vibrations that occur here. These include single bond stretches and a wide variety of bending vibrations. This region gets its name since nearly all molecules (even very similar ones) have a unique pattern of absorptions in this region. |

Schematic of the Extrusion-Coating Process

LIDDING STRUCTURE BASED ON AROMATIC POLYESTER FILM, EXTRUSION-COATED WITH A SEALABLE/PEELABLE COPOLYESTER LAYER

FIELD OF THE INVENTION

The embodiments herein relate to a heat-sealable film for peelable container lids and a method of making such film. For example, they relate to a composite having a polyethylene terephthalate (PET) film extrusion-coated with a suitable co-polyester layer that provides heat sealability, forming a substantially completely peelable multilayer film suitable for container lids.

BACKGROUND OF THE INVENTION

Peelable packaging films are frequently utilized in diverse container sealing applications. Primarily they are used to seal the mouths of foodstuff or medicine containers. In such applications, they firstly provide closure of the mouth to prevent unintended initial loss of the contents. They provide a solid-, vapor- and liquid-tight barrier to prevent contamination and spoilage of the contents. Being non-resealable once opened, they provide a security function by alerting the consumer whether the contents of a presumably unopened container have been potentially tampered with. Films intended for container sealing applications such as these are sometimes referred to as "lidding" film. (See FIG. 1.)

Most basically, conventional lidding films include at least two component layers. First a base layer forms a mechanical closure preventing foreign substances from entering the container. Second a seal layer, which has a melting point or softening point below that of the base layer, which most commonly is thermally adhered to the circumference of the container mouth, provides a seal removable by peeling, preferably without tearing or leaving sealant material on the container. Many sophisticated modifications and additions to these basic components have developed to provide advantageous features to peelably lidded containers.

A particular disadvantage of some peelable-lidded containers is that the adhesion of the lidding film to the container is so strong that the film is difficult to remove from the container without destruction of the seal layer or tears in the entire film cross-sections; in such cases, the strong adhesion can undesirably wholly or partially delaminate the lidding film leaving pieces adhered to the lip of the container mouth. If the adhesion to the container mouth is made too weak, the lidding film can be removed inadvertently or prematurely by many incidental causes including, for example, pressure and movement of the contained material. Ideally a seal layer that combines a good seal strength (typically in excess of 0.7 lb/in) and also a clean peel, free of tears is desired. A further requirement is that a seal with good peel characteristics can be obtained over a wide temperature range, typically between 350 and 420° F. for CPET (crystalline polyethylene terephthalate) and between 200-300° F. for APET (amorphous polyethylene terephthalate) trays. Within each range, it is desirable that the seal strength profile vs. temperature be as flat as possible, to allow interchangeability between different packaging sites using different sealer settings.

Many sealable films known in the art are coextruded. Films made by coextruding PET as a base layer with an amorphous PET copolymer (typically obtained by substituting, e.g. 18 mole % of the terephthalic acid with isophthalic acid or by substituting up to 33 mole % of the ethylene glycol with cyclohexanedimenthanol) are often used in applications requiring permanent sealing of the film to itself, e.g. bag construction. While these coextruded films are cost-effective to produce, the films obtained are not truly peelable as they often tear and split when removed from the package, often sticking to the food, especially to foods that contain sauces and cheese such as pizza. One reason for this is that seal materials that are coextrudable with PET (such as the copolyester of ethylene glycol with about 82 molar parts terephthalic acid/and 18 molar parts isophthalic acid or the copolyester of terephthalic acid with about 33 mole % of 1,4-cyclohexane dimethanol with about 67 mole % of ethylene glycol (for example, Eastman Chemical Co.'s Eastar™ grade PETG™ 6763) require a high melt viscosity in order to be compatible with PET in coextrusion. As a result, of this high viscosity, they cannot form adequate seals on CPET trays unless the seal temperature approaches that of the melting point of the CPET substrate. This, combined with the fact that such materials have typically glass transition temperature (Tg) above room temperature results in destructive seals.

Several patents propose as a remedy coextrusion of a seal layer consisting of a copolyester partially based on aliphatic dicarboxylic acids (such as adipic, sebacic, azelaic acids) and partially based on aromatic acids such as terephthalic acid, that have glass transition temperatures below room temperature (typically in the range between –0° C. and 10° C. and melt temperatures generally below 160° C.). A melting temperature (Tm) in this range enables sealing at temperatures suitable for CPET or APET trays whereas the Tg below room temperature enables peeling characterized by plastic deformation (yield) which enables the film to sustain stresses resulting from peeling forces without suffering brittle failure. U.S. Pat. Nos. 7,205,040; 7,141,293; 7,329,453; and 7,442,427 describe coextruded seal layers comprising copolyesters based on aromatic/aliphatic diacarbocylic acid combinations providing peelable seal strengths in the range of 1.1 to 3.4 lb/in at a seal temperature of 392° F., depending on exact copolyester composition and skin thickness. Although those patents do not allude to any issues related to coextrusion stability, it has been the experience of the applicant that a disadvantage of coextrusion processes consisting of skin layers of copolyesters based partially on aliphatic diacids is the frequent occurrence of flow instabilities related to viscosity mismatch between the less viscous partially aliphatic diacid-based copolyester skin and the higher-viscosity polyethylene terephthalate core; even if a lower melt extrusion temperature is employed on the skin or satellite extruder, the die block has to be kept at a temperature above the melting temperature of the PET homopolymer, (typically above 505° F.) which reheats the skin material to a temperature where its viscosity becomes too low resulting in gross irregularities.

Because of the difficulty in consistently coextruding with PET a suitable hot melt adhesive skin layer material providing peelable seals, alternative methods such as offline or inline coating techniques have been employed.

Off-line coating can be conducted either by melt extrusion (extrusion coating) or by solvent coating, which bears the additional cost and environmental risk of handling organic solvents.

Exemplary peelable, sealable films used for lidding and packaging foods known in the art are described in U.S. Pat. No. 5,888,599. These films are prepared by a multi-step process in which a core film is first prepared comprising a base layer which is then solvent-coated with a hot melt adhesive in a separate step (off-line coating;) to form a skin layer whose function is to provide a peelable heat seal. Peelable seal strengths up to 0.88 lb/in have been attained at seal temperature 180° C. and seal layer thickness of about 2 µm; however solvent-coating techniques present the disadvantage of additional costs and environmenal risks associated with handling and recycling organic solvents Sealable extrusion coatings laminated off-line can be either polyesters (such as those described for example in US patent application US2004/0052993 or vinyl polyolefins such as ethylene vinyl acetate (EVA). A disadvantage of off-line coated polyester sealants is that, if done by extrusion coating, that process results in relatively thick coatings (typically 20 µm or higher) which increase the overall cost significantly; or, if applied by solvent coating, the solvents have the disadvantages listed above. EVA coatings have the disadvantage of poor adhesion to the PET base film; for that reason, additional primer and tie layers need to be applied during extrusion coating, which increase overall cost and complexity.

Inline coating methods are preferable because they result in lower thickness; in such methods, the coating is conducted between the machine direction orientation and the transverse direction orientation steps that are parts of a typical biaxial orientation film production process. For instance, U.S. Pat. No. 6,939,584 describes an inline extrusion coating method for obtaining a heat-sealable and peelable skin layer consisting of a copolyester derived from one or more dicarboxylic acids and one ore more glycols. In the examples, a coating comprised of a copolyester of sebacic acid/terephthalic acid/butylene glycol (50/50/100) having a Tg of −40° C. and a Tm of 117° C., with final thickness 1.5-2 µm, provided a heat seal strength of 1.87 lb/in on an APET/CPET tray (sealing on the APET surface) at a sealing temperature of 180° C. (356° F.). Identical seal strength was provided by copolyester of azelaic acid/terephthalic acid/ethylene glycol (45/55/100) having a Tg of −15° C. and a Tm of 150° C. Whereas such a sealing temperature is suitable for an APET/CPET tray (thanks to the CPET support) it is too high for a 100% (transparent) APET tray due to excessive distortion. Typical APET trays are sealed at temperatures of 300° F. or lower. At such a temperature, the aforementioned compositions are expected to provide lower seal strengths.

The above patent also recognises the benefit of the base film itself comprising two distinct layers, where the layer upon which the coating composition is applied may comprise a polymer which itself has heat-sealability. The explanation provided is that the heat-sealable layer presence in the base film helps provide a stronger bond of the coated layer on to the tray or that it results in material savings in terms of allowing a lower thickness of the coating layer. The applicant has found that an additional benefit from the presence of a heat-sealable layer in the base film is that it facilitates good adhesion of the coating layer to the base film.

Alternatively to inline extrusion coating, inline coating with aqueous suspensions of hot-melt polymeric substances is also possible, provided that formation of stable suspensions and achievement of coalescence during the transverse orientation step are possible. For example, WO A-96/19333 describes a process for producing peelable films, in which the heat-sealable, peelable layer is applied inline to the polyester film from an aqueous dispersion that also contains about 10 wt % of an organic solvent. In the example provided, the heat-sealable material is a copolyester of terephthalic acid/adipic acid/sulfoisophthalic acid/butane-diol, ethylene glycol, and polybutane-diol. A peel strength of 0.82 lb/in is achieved with a coating thickness of 1.5 µm at a sealing temperature of 180° C. (356° F.) on an APET/CPET tray. Again, this temperature would be too high for a 100% APET tray and the expected seal strength is expected to be lower at the maximum seal temperature used of APET trays (around 300° F.).

Despite the extensive prior art in the preparation of laminates consisting of a PET base layer and a copolyester made from a combination of aliphatic and aromatic dicarboxylic acids as the seal layer by coextrusion, offline or inline coating methods, previous investigators failed to recognize the importance of controlling the crystallinity developed in the seal layer during the cooling process of the coating towards attaining exceptionally high but also peelable seal strengths at temperatures lower than those exemplified in the prior art, which make strong seals to APET possible.

The applicant has found that by proper selection of the aromatic/aliphatic copolyester composition the goal of achieving high peelable seal strengths, at relatively low temperatures, by extrusion coating methods, can be achieved.

BRIEF DESCRIPTION OF THE DRAWINGS

FIGS. 5A, 5B and 5C: Lists of chemical groups in Griltex™ D 1939E, Griltex™ 6E and Griltex™ D 2274E according to Fourier Transform Infra Red (FTIR) spectroscopy plots of Griltex™ D 1939E, Griltex™ 6E and Griltex™ D 2274E.

SUMMARY OF THE INVENTION

The embodiments herein relate to a multilayer composite lidding film having at least two main component layers, namely in order, a polymeric base layer for mechanical integrity and a heat seal layer comprising a hot melt copolyester adhesive selected from a class based partially on aliphatic and partially on aromatic dicarboxylic acids.

The heat seal layer is constructed by offline or inline extrusion coating. When a certain copolyester, combining Tg below room temperature, Tm between 120-150° C., and low crystallization on cooling is employed, peelable seals, in excess of 4 lb/in can be attained on CPET trays within the customary seal temperature range for CPET (275-425° F.) and in excess of about 1 lb/in on APET trays within the customeray range for APET (200-300° F.), when the coating thickness is about 75 µm.

DETAILED DESCRIPTION OF THE INVENTION

All publications, patents, and patent applications cited in this Specification are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The term "slow rate of crystallization" in the context of a material refers to a material having substantially no exotherm of crystallization on cooling from melt during a differential thermal calorimetry (DSC) scan at 10° C./minute.

The term "crystallizable" in the context of a material refers to a material having an exotherm of crystallization on cooling from melt during a differential thermal calorimetry (DSC) scan at 10° C./minute.

Figure 1:
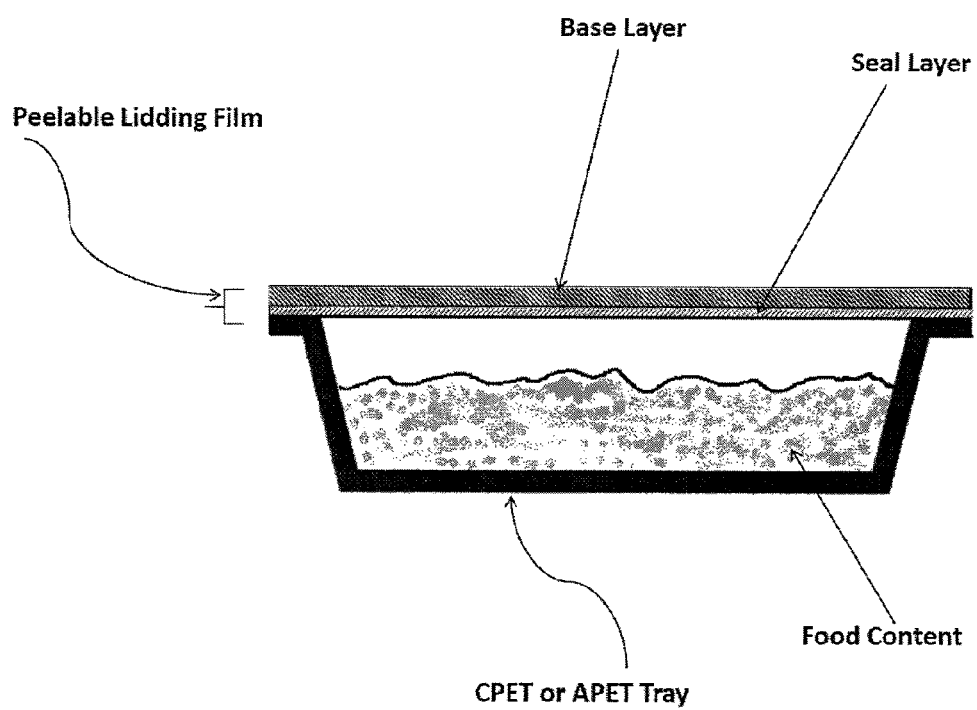
FIG. 1—Schematic showing a container with a film as a lid.
Figure 2:
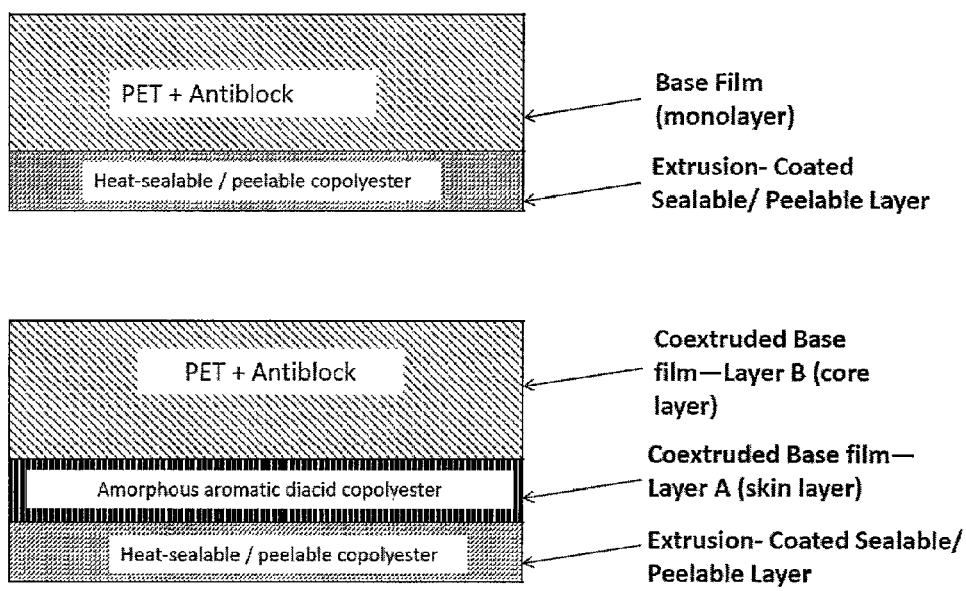
FIG. 2—Schematic of structures of two- and three-layer lidding films.

FIG. 2 shows a schematic of structures of two- and three-layer lidding films. The base layer provides structural integrity of the film and support for the other layers. The base layer predominantly comprises biaxially stretched polyethylene terephthalate. Preferably, the base film comprises a skin layer A, coextruded on top of the main PET layer B, which skin layer comprises a low melting or amorphous aromatic copolyester (such as one based on terephthalate/isophthalate copolymer with ethylene glycol or a copolyester made from a combination of terephthalic acid, ethylene glycol, and cyclohexyldimethanol. The role of skin layer A as part of the base film is in facilitating better adhesion of the heat seal layer during the coating process. The base layer may also optionally include organic or inorganic particulates for various purposes such as to facilitate winding and handling of the film, or to enhance the mechanical and optical properties of the film, including reduction of the density of the film via cavitation. Representative examples of such particulate additives to the base layer are, but not limited to: amorphous silica, calcium carbonate, clay, talc, diatomaceous earth, cross-linked spherical polymers such as poly(dimethylsiloxane), glass beads, or mixtures of two or more of these. Moreover, to reduce material costs the base layer can optionally include a filler or extender component, such as regrinded recycled layer or film composition, or any other polymeric composition having suitably compatible processing and physical properties.

The base layer can be stretched in one or two orthogonal directions, i.e., for mono- or biaxial orientation. This treatment provides greater strength for the layer, and thus also for the overall film. It also permits the film to be produced to a thinner cross section dimension.

As will be further explained, sealing of the lid formed by the novel film to a storage container is achieved by a thermally activated bond between the outer, heat seal layer of this film and the container mouth. For effective peel performance when the consumer removes the lid, it is important that the strength of the bond between the heat seal layer and the underlying barrier layer is robust and durable. Selection of the adhesion layer and the method of incorporating it into the multilayer film have been developed to advantageously produce such adhesion very efficiently.

The heat seal layer (sometimes referred to as the skin layer or skin layer "A") comprises a thermally activatable adhesive composition, typically referred to as hot melt adhesive resin. The skin layer provides the film with the ability to be heat-sealed to itself or to other films, sheets, trays or other substrates. These other materials are typically made from crystallized polyethylene terephthalate (CPET), amorphous polyethylene terephthalate (APET), foil, polyethylene terephthalate-coated paperboard, polyvinyl chloride (PVC), glass, aliphatic olefin polymers such as polypropylene (PP) and polyethylene (PE), and other polyolefins such as polystyrene (PS) and the like.

The preferred hot melt, thermally activatable adhesive composition includes polymers selected from the group consisting of copolyesters comprising at least partially of: aliphatic diacid moieties, such as adipic acid, sebacic acid, azelaic acid; and/or comprising aliphatic diol moieties, such as heaxanediol; aromatic acid and aromatic diol moieties may also be present, such as terephthalic acid, isophthalic acid, ethylene glycol, cycloehexyldimethanol, etc.

The inventive heat-seal layer compositions were found to be copolyesters that possess the following combination of physical properties: a melting point in the range 120-160° C.; a Tg below room temperature, preferably below 10° C. (common temperature of a container taken recently out of a refrigerator); and a slow crystallization rate on cooling, manifested by a crystallization exotherm during slow cooling by differential scanning calorimetry (DSC) at a rate of 10° C./min being essentially absent. An exemplary copolyester selected from that class of polyesters, having a proprietary composition, was found to provide peelable seals on CPET or APET (even silicone-treated APET which is more difficult to seal on) containers, superior to those attained by the prior art and by copolyesters falling outside this thermal property range (which gave seal properties in line with those reported in the prior art).

The heat seal composition is applied by extrusion coating methods well known in the art. Extrusion coating can be caned out offline or inline. The heat seal layer composition can be modified by addition of organic or inorganic particulates for various purposes. Representative examples of such additives include, but are not limited to: amorphous silica, calcium carbonate, clay, talc, diatomaceous earth, cross-linked spherical polydimethylsiloxane, cross-linked spherical organic polymers, or glass beads, or mixtures of two or more of these ingredients; slip agents such as but not limited to a fatty amide: erucamide, stearamide, behenamide, or bisamides (e.g. stearyl-erucamide), silicone oil, mixtures of same; anti-fog agents such as, but not limited to glycerol monostearate; and anti-static agents such as, but not limited to glycerol monostearate and tertiary amines, or combinations thereof. The heat seal layer can be monolithic or it can be formed from two or more strata. A stratified heat seal layer can be free of certain additives in its sub-layers, i.e., those closer to the adhesive layer and additives in the outermost stratum. For example, slip agent particulates can be incorporated into the outermost stratum of the heat seal layer to reduce blocking of the film and promote ease of film handling. This particular seal layer can also be modified by an electrical or discharge-treatment method (such as corona, flame, or plasma) to provide specific seal properties to specific substrates. The desired applied watt density for this layer could be in range of 0.5 to 5 (watts/square feet/min).

Certain additives are useful in modifying properties other than sealing properties of the peelable blend. Examples of some of the properties which can be modified are UV stability, thermal stability and color.

While the embodiments have been described in detail and with reference to specific examples thereof, it will be apparent to one skilled in the art that various changes and modifications can be made therein without departing from the spirit and scope thereof.

Examples

The following Examples are being submitted to further define various species of the present disclosure. These Examples are intended to be illustrative only and are not intended to limit the scope of the present disclosure. Also, parts and percentages are by weight unless otherwise indicated.

Copolyester Materials Used in Extrusion Coating Examples and Comparative Examples The materials used in the seal layer consisted of partially aliphatic copolyesters obtained from EMS Chemie in pellet form. These materials are produced by condensation polymerization of various combinations of terephthalic acid, isophthalic acid, azelaic acid, and sebacic acid with butanediol. Other than Griltex™ 6E, these materials constitute proprietary compositions with the exact structure undisclosed publicly.

TABLE 1

| | Griltex ™ D 1393E | Griltex ™ 6E | Griltex ™ D 2274E |
|---|---|---|---|
| Tm (Melting Point,) ° C. | 150 | 140 | 147 |
| Tg (Glass Transition), ° C. | −22 | 28 | 9 |
| Temperature of Crystallization on Cooling from the Melt, ° C. | 103 | 95 | None detected |
| Exotherm of Crystallization on Cooling from the Melt, J/g @ 10° C./min | 18 | 0.27 | 0 |
| Melt Flow Rate, ml/min (at 160° C. under 2.16 kg force) | 81 | 13 | 23 |

Griltex™ D 1939E copolyester (proprietary composition) with Tg of −22° C. (quoted from supplier's Technical Data Sheet) and a Tm around 150° C. (measured on second heat after melting and cooling via DSC) and fast rate of crystallization, as manifested by the significant crystallization exotherm, shown in Table 1.

Griltex™ 6E (a copolyester of terephthalic acid, isophthalic acid, and butanediol based on tracking down its chemical composition online on the ChemSpider database from its CAS number published on the EMS MSDS) with Tg of 28° C. (quoted from supplier's Technical Data Sheet) and a Tm around 140° C. and moderate rate of crystallization.

Figure 3A:
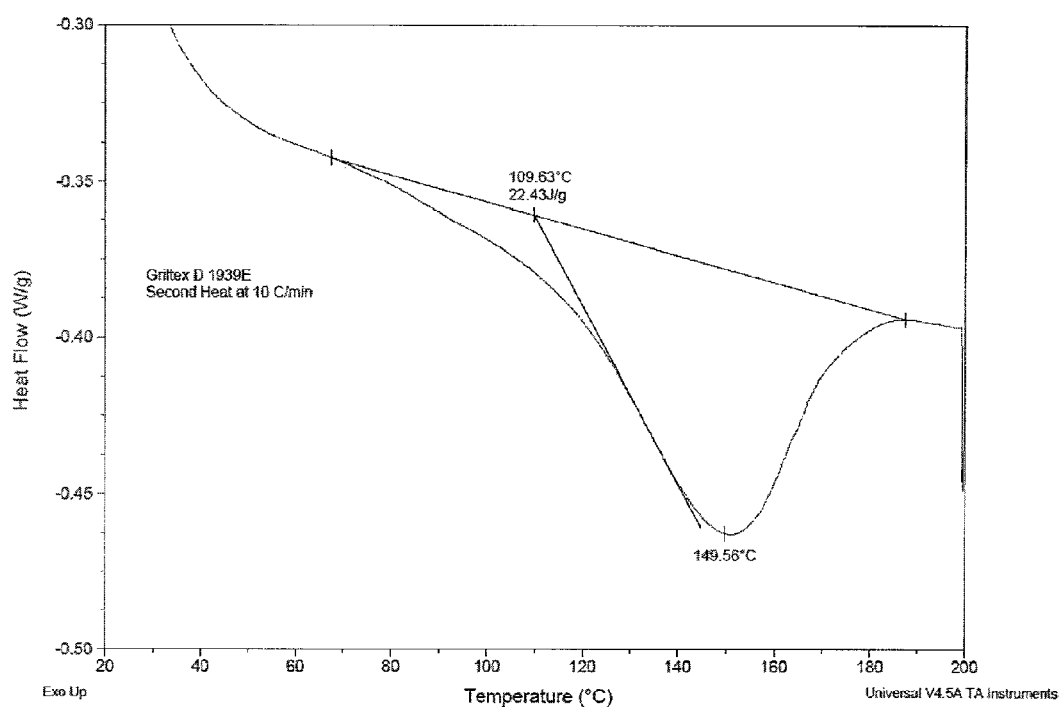
FIGS. 3A, 3B and 3C: Differential Scanning calorimetry (DSC) plots of Griltex™ D 1939E, Griltex™ 6E and Griltex™ D 2274E.
Figure 3B:
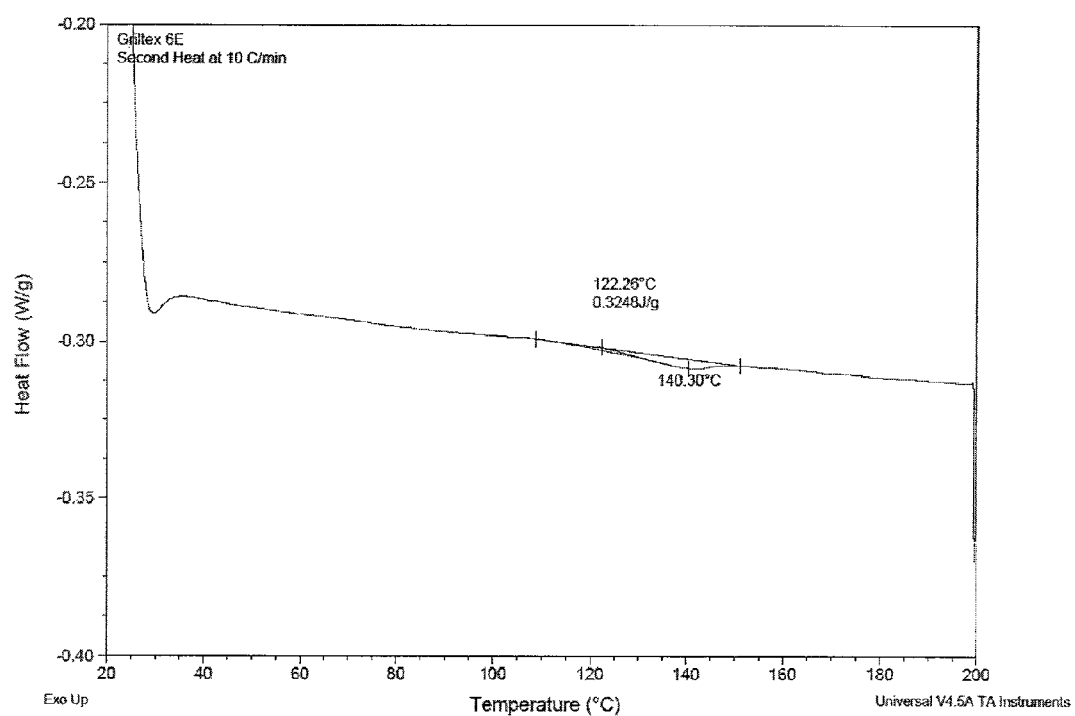
Figure 3C:
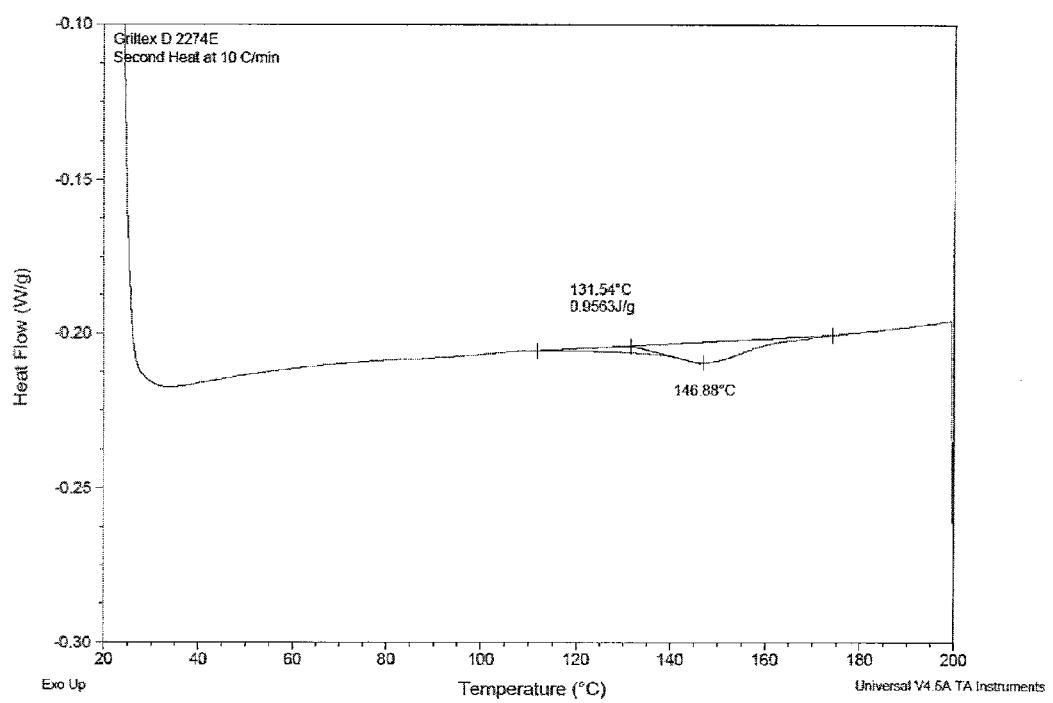

Griltex™ D 2274E copolyester with Tg of 9° C. (quoted from supplier's Technical Data Sheet) and a Tm around 150° C. (measured on second heat after melting and cooling via DSC) and slow rate of crystallization FIGS. 3A, 3B, and 3C show DSC scans of Griltex™ D 1939E, Griltex™ 6E and Griltex™ D 2274E. These scans contain vertical marks. Each of the original scan does not contain the vertical marks or the horizontal baseline or the other straight line that's tangent to the portion of the curve going downwards. These are generated by the analysis program.

For example, refer to the plot for 1939E. There are four vertical marks on this plot. The first and the last ones are manually selected by the analyst to represent the onset and the completion of the melting peak ("melting endotherm"). The melting endotherm is what appears like a "trough". There is some degree of arbitrariness in selecting those two points. Essentially the analyst is trying to pinpoint where one thinks that the curve departs from the baseline and then when it returns to the baseline again. Once these two points are selected, the program integrates the peak underneath and automatically inserts the second and the third vertical marks in order to calculate three things: (a) the linear onset of melting (=109.63° C.). this is where the diagonal straight line meets the baseline at the intersection, represented by the second vertical mark; (both the straight baseline and this tangent straight line are drawn by the program and are not part of the original scan); (b) the third vertical mark is the peak (in this case minimum value) of the endotherm (=149.56° C.), which is taken to represent the "melting point" of the polymer; and (c) the result of the integration of the area between the baseline and the curve represents the heat of fusion (in this case it is 22.43 J/g). This large number is due to the high crystallinity of 1939E.

In the case of 6E and D 2274E, the heat of fusion value is much smaller indicating that the polymer develops very little crystallinity. This is why 2274E is a preferred seal layer material as in essence the nearly amorphous character (very low crystallinity) enables it to flow and seal onto CPET or APET over a broad range of temperatures even below its melting point.

The low crystallinity present in 2274E is not the only factor for it being the preferred material, since 6E, which is not a preferred material in terms of peel strength, also has very low crystallinity. There is one more condition to be met, and that is that the glass transition temperature (Tg) must be below room temperature. This is not shown on the DSC plot because the DSC instrument used for creating the DSC plots could not be cooled down to below 20° C. while the Tg 2274E is 9° C. (number obtained from the supplier's Technical Data sheet). In the case of 6E, FIG. 3B actually shows indirect evidence of the Tg occurring around 28° C. but it is partially masked by the transient response range: the indirect evidence is the small blip right after the transient (downward) range. This is referred to as "amorphous relaxation" and it typically occurs right after the Tg (which is a step change in the baseline, which one cannot see because it is masked by the much stronger transient response at lower temperatures).

The Tg's reported on Table 1 were obtained them from the manufacturer's technical data sheets. The reported Tg of Griltex™ D 2274E is below room temperature (9° C.), whereas the Tg of Griltex™ 6E is above room temperature (28° C.). This means that at the temperature where the peel test takes place (room temperature nominal 23° C.), D 2274E has viscoplastic behavior whereas 6E has glassy behavior (brittle). Thus, Griltex™ D 2274E is capable of higher deformations before it peels off, resulting in higher forces required to unpeel it.

The positive or negative slope of the DSC plot is not important. The slope of the DSC plot has to do with random variations between the weight and specific heat of the DSC tray used to carry the sample and the nominally identical empty tray used as a reference (ideally the baseline would be horizontal but it hardly ever is).

Figure 4A:
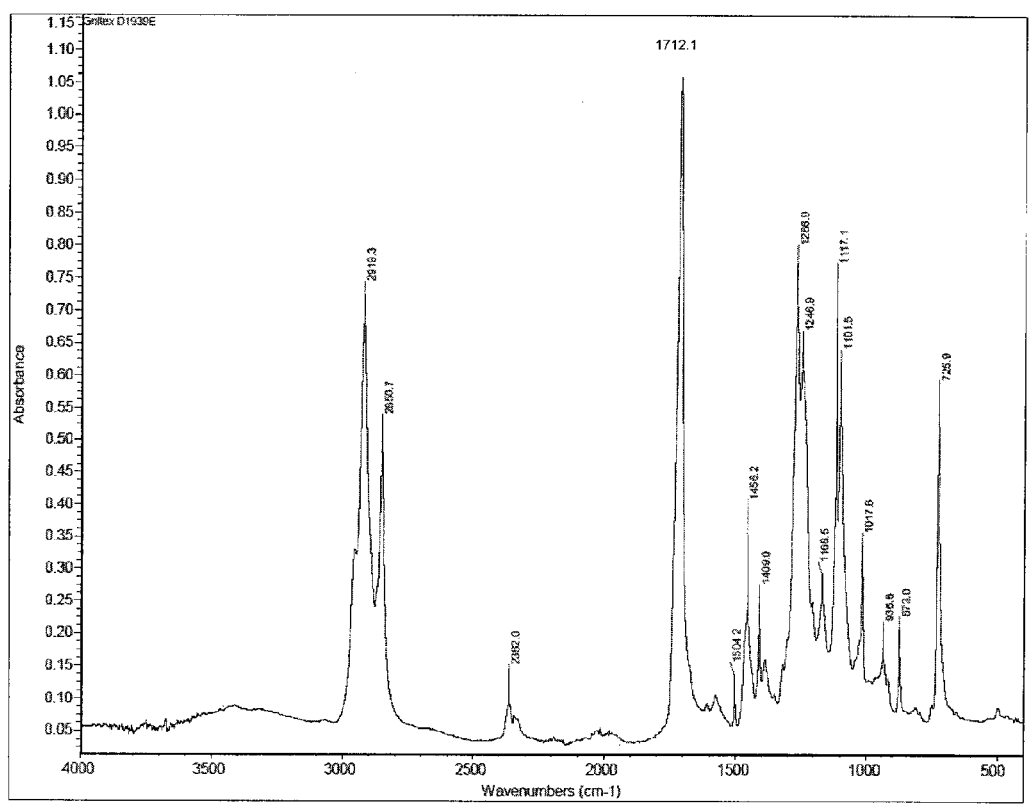
FIGS. 4A, 4B and 4C: Fourier Transform Infra Red (FTIR) spectroscopy plots of Griltex™ D 1939E, Griltex™ 6E and Griltex™ D 2274E.
Figure 4B:
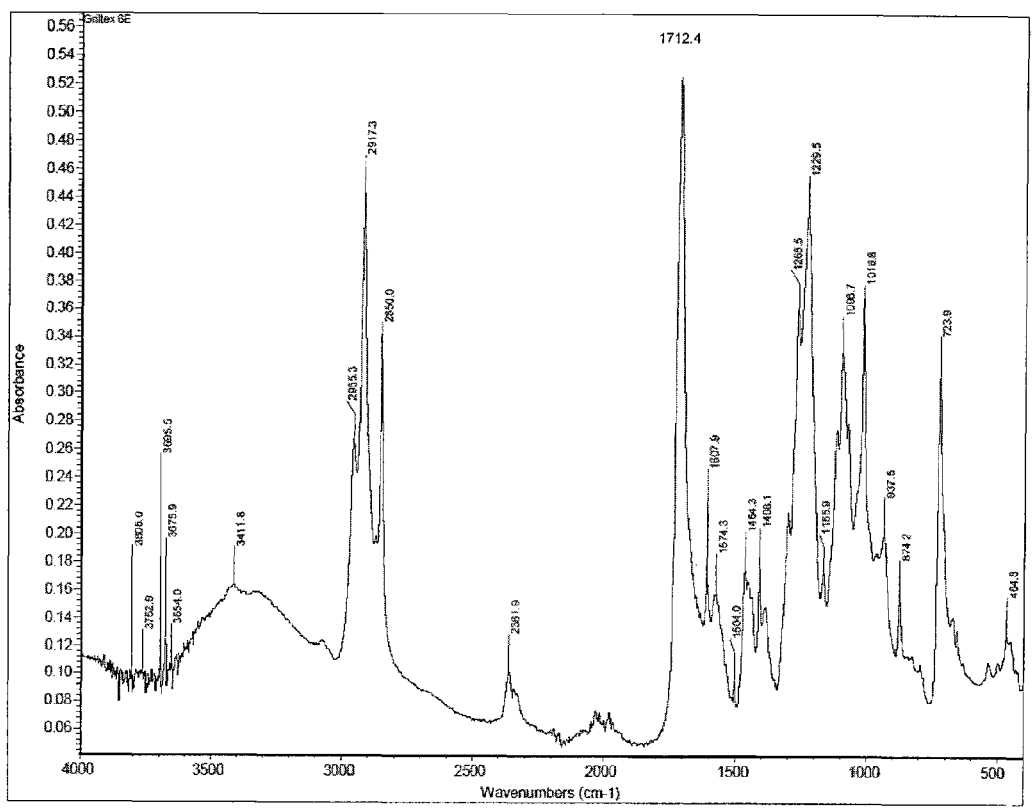
Figure 4C:
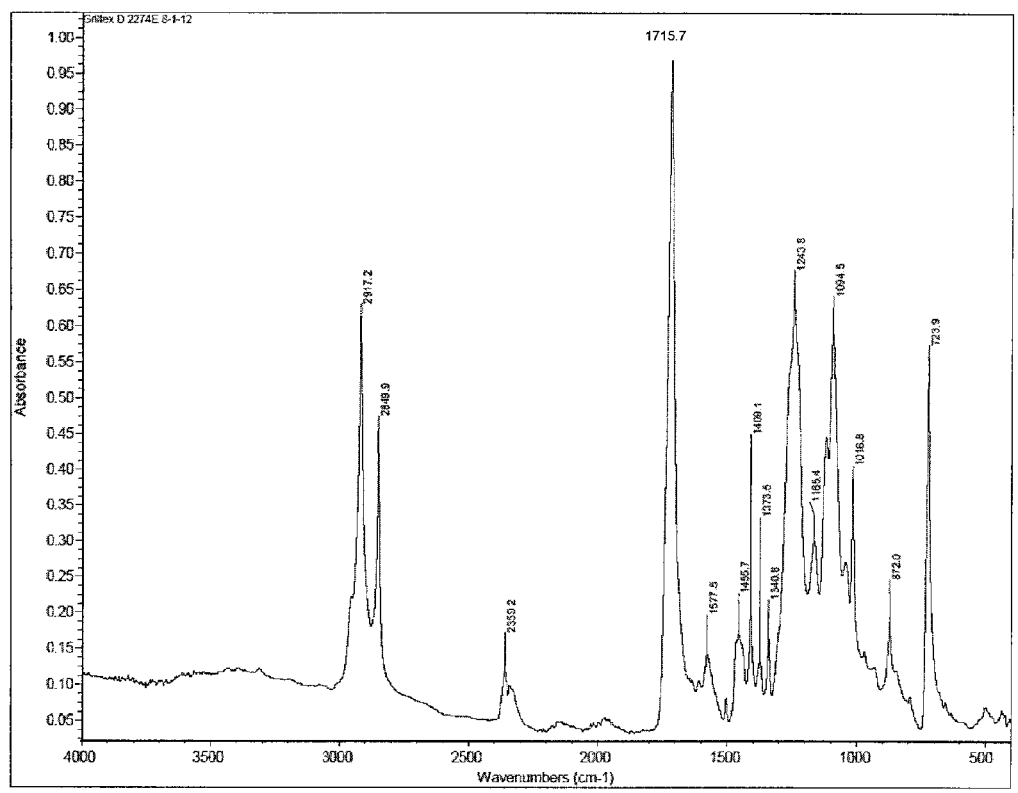

FIGS. 4A, 4B and 4C show Fourier Transform Infra Red (FTIR) spectroscopy plots of Griltex™ 1939E, Griltex™ 6E and Griltex™ 2274E. FTIR is an instrumented analytical technique triggering molecular vibrations through irradiation with infrared light. It provides mostly information about the presence or absence of certain functional groups. Upon irradiation with infrared light, certain bonds respond by vibrating faster. This response can be detected and translated into a visual representation called a spectrum, as shown in FIGS. 4A, 4B, and 4C. Covalent bonds can vibrate in several modes, including stretching, rocking, and scissoring. The most useful bands in an infrared spectrum correspond to stretching frequencies. When a chemical sample is exposed to the action of IR light, it can absorb some frequencies and transmit the rest, depending on the presence or absence of bonds that vibrate at those frequencies. The IR spectrum is basically a plot of transmitted (or absorbed) frequencies vs. intensity of the transmission (or absorption). Frequencies appear in the x-axis in units of inverse centimeters (wavenumbers), and intensities are plotted on the y-axis in percentage units. The graphs above shows a spectrum in absorption mode, specifically "absorbance" units: absorbance is defined as $-\log T$, where T is tranmittance, defined as $T=I/I_0$, I being the exiting IR light intensity and $I_0$ the incident IR light intensity.

FIGS. 5A, 5B and 5C show lists of identified chemical groups in Griltex™ D 1939E, Griltex™ 6E and Griltex™ D 2274E according to Fourier Transform Infra Red (FTIR) spectroscopy plots of Griltex™ 1939E, Griltex™ 6E and Griltex™ 2274E. All three display methylene and ester groups consistent with polyesters that contain aliphatic diols and/or sliphatic diacids. There is also some evidence or aromatic rings. The key peaks and the corresponding groups are:

2850-3000 cm-1 (C—H stretch);

1720 cm-1 (C=O stretch)) (carbonyl, consistent with —COO— ester group always present in polyester compositions); and 1265-1230 cm-1 {(C=O)—O vibration} again consistent with —COO— ester group and the broad band between 3200-3600 cm-1 (O—H stretch), which manifests the presence of —OH end groups (likely to be there in a polyester) but also and more strongly coming from residual moisture (H2O) present in the pellet.

The "fingerprint section shows mostly peaks at similar wavelengths for all three but different proportions, suggesting that the same functional groups are present in all three but at different proportions such that the physical properties of the three resins are different.

Base Film

The base film was a commercial 36G (9 μm) thick coextruded A/B-type polyester film (Lumirror™ PA10 produced by Toray Plastics (America), Inc.) comprising a main (B) layer of nominal 8.5 μm thickness, consisting of PET homopolymer blended with about 6.5% of silica anti-block particles; and a secondary (A) layer of nominal 0.5 μm thickness, consisting of an isophthalic acid co-terephthalic acid random co-polyester co-polymer with 100% ethylene glycol as the diol component, having an IV of about 0.65 and a mol ratio of about 18% isophthalic acid and 82% terephthalic acid, commercially available from Invista as 8906™.

Several other base films are disclosed in the following US Patents and Applications, all of which are incorporated by reference in their entirety:

U.S. Patents:

U.S. Pat. No. 8,133,592 (Toray)

U.S. Pat. No. 7,655,291 (Toray)

U.S. Pat. No. 7,943,230 (Toyo Boseki)

U.S. Pat. No. 7,521,103 (Mitsubishi Polyester Films)

US Patent Applications:

20120128956 (Toyo Boeski)

20110236706 (Toray)

20080193783 (Toyo Boseki)

20090240024 (SKC)

20110077339 (Kolon)

Test Methods

The various properties in the above examples were measured by the following methods:

Intrinsic viscosity (IV) of the film and resin were tested according to ASTM D 460. This test method is for the IV determination of poly(ethylene terephthalate) (PET) soluble at 0.50% concentration in a 60/40 ratio of phenol/1,1,2,2-tetrachloroethane solution by means of a glass capillary viscometer.

Melting point of copolyester resin is measured using a TA Instruments Differential Scanning calorimeter model 2920. A 0.007 g resin sample is tested, substantially in accordance to ASTM D3418-03. The preliminary thermal cycle is not used, consistent with Note 6 of the ASTM Standard. The sample is then heated up to 200° C. temperature at a rate of 10° C./minute, while heat flow and temperature data are recorded. The melting point is reported as the temperature at the endothermic peak.

Temperature of crystallization on cooling was measured in the same DSC apparatus subsequent to the DSC scan described above used to determine melting point: after the second melting scan, the sample was cooled down at a rate of 10° C./min, while heat flow and temperature data are recorded. The temperature of crystallization is reported as the endothermic peak; the heat of crystallization is calculated by integrating the area under the endothermic peak.

Seal Strength was measured by heat sealing on a SENTINEL Sealer model 12 ASL at temperatures between 200° F. and 425° F. (25° F. intervals), 0.5 second dwell, and 30 psi seal jaw pressure. The test specimen consisted of a 1" wide piece of lidding film and a 1" wide piece of CPET or APET tray (cut from the unoriented inside bottom surface). Sealing was done between that surface and the heat-seal layer coated surface of the film. Peel strength was measured at 180° angle using an E-Z Peel Tester from Shimadzu at a rate of 12 in/min. The tester calculates the average of the zig-zag pattern during the steady state section of the peel (horizontal average) without taking into account the original stress inception or the final stress decay section when the film reaches the end of the sealed portion. The test is repeated three times and the number provided in the examples is the average of the three steady-state averages. The following patents by Mitsubishi Polyester Films, all of which are incorporated by reference in their entirety, contain a schematic explaining the E-Z Peel test:

U.S. Pat. No. 7,141,293 (FIG. 2)

U.S. Pat. No. 7,442,427 (FIG. 2)

U.S. Pat. No. 7,329,453 (FIG. 2)

U.S. Pat. No. 7,205,040 (FIG. 2)

Seal Initiation Temperature (SIT) is interpolated from the seal strength vs. temperature data, data as the temperature corresponding to a seal strength of 200 gf/in (0.44 lb/in).

Example 1 (Ex. 1)

Figure 6:
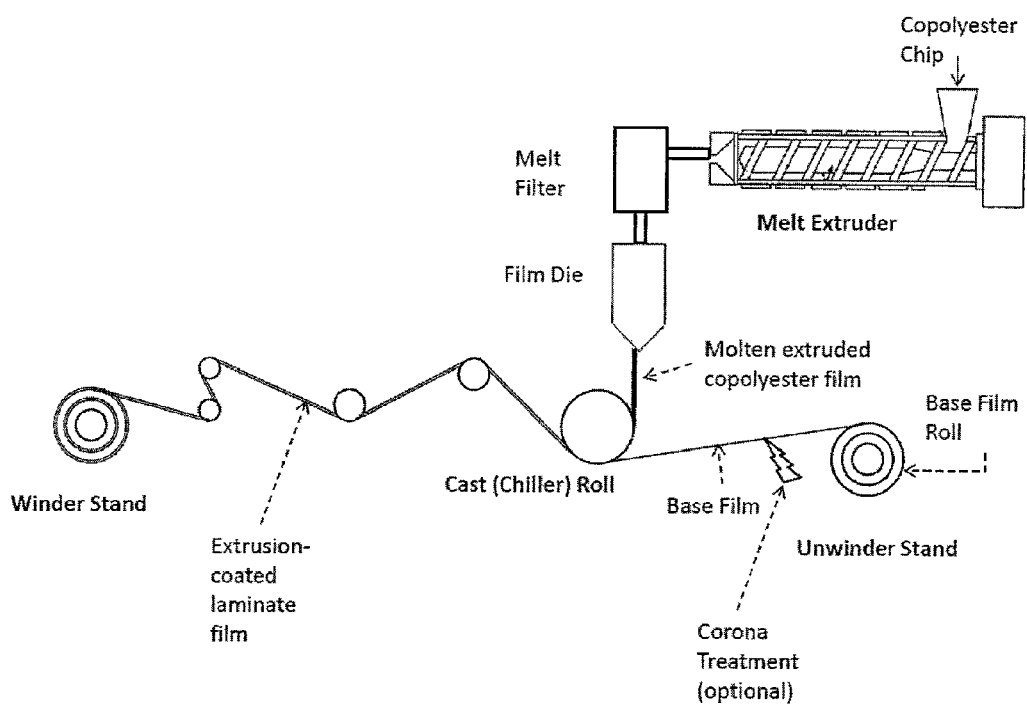
FIG. 6: Schematic of the multilayer composite lidding film manufacturing process.

FIG. 6 shows a schematic of the multilayer composite lidding film manufacturing process. Pellets from copolyester grade Griltex™ 2274E were dried overnight at 150° F. in a desiccant forced air circulation dryer (dew point −40° F.) and were subsequently fed into a single extruder at barrel settings resulting in melt temperature 181° C.; the melt was extruded through a film-forming die and cast on a polished chilled drum where it came into contact with the isophthalate-modified ("IPET") amorphous polyester skin side of a commercial Lumirror™ PA10 biaxially oriented 36 ga (9 µm) film that was being fed past the same chilled drum by unwinding from a previously made roll. The order of the lamination was as follows: chill drum/Griltex™ 2274E extrudate/IPET surface. The resulting laminate was wound up in a final roll and the coating layer was found to possess good adhesion on the PA10 substrate (no delamination possible). The extruder RPM and the final wind-up speed were adjusted to obtain a coating thickness as low as possible, while at the same time maintaining a uniform coating width along the machine direction. The thickness of the coating layer was measured to be around 75 µm. The seal seam strengths on CPET are shown in Table 2. Seal strengths on APET are shown in Table 3. Clean peels were obtained in all cases.

Example 2 (Ex. 2)

Example 1 was repeated, using Griltex™ 2274E again as the extrusion coating compound, but this time the coating was conducted on the homopolymer PET side of the 36 ga (9 µm) Lumirror™ PA10 film, i.e. the side opposite the IPET skin side. The bonding strength between the extrusion coated layer and the substrate layer was about 0.12 lb/in. The seal strengths of the coated side on CPET were clean/peelable and almost as good as those from Example 1.

TABLE 2

| Seal Strength (lb/in) on CPET Trays | | | | | | | | | |
|---|---|---|---|---|---|---|---|---|---|
| | 200° F. | 225° F. | 250° F. | 275° F. | 300° F. | 325° F. | 350° F. | 375° F. | 400° F. | SIT (° F.) |
| Ex. 1 | 2.2 | 3.3 | 3.1 | 4.0 | 4.7 | 4.6 | 5.0 | 5.3 | 5.9 | <200 |
| Ex. 2 | 1.2 | 2.8 | 5.0 | 4.1 | 4.8 | 4.4 | 6.3 | | | <200 |
| CEx. 1 | | | | | 0.2 | 0.6 | 1.0 | 0.8 | 0.6 | 316 |
| CEx. 2 | | | | | 0.2 | 0.4 | 1.8 | 2.2 | 2.5 | 325 |

SIT = Seal Initiation Temperature

TABLE 3

| Seal Strength (lb/in) on APET Trays | | | | | |
|---|---|---|---|---|---|
| | 200° F. | 225° F. | 250° F. | 275° F. | 300° F. | SIT (° F.) |
| Ex. 1 | 1.0 | 1.6 | 2.5 | 4.0 | 5.1 | <200 |
| CEx. 1 | | | 0.1 | 0.3 | 0.5 | 290 |
| CEx. 2 | | | | | 0.1 | >300 |

Comparative Example 1 (CEx. 1)

Example 1 was repeated but this time Griltex™ 6E copolyester was extrusion-coated on the IPET side of the 36ga (9 µm) Lumirror™ PA10 film. The seal seam strengths on CPET are shown in Table 2. Seal strengths on APET are shown in Table 3. Clean peels were obtained in all cases. However, the seal strengths obtained were not higher than those reported previously in the prior art for sealable layers comprising copolyesters from aromatic/aliphatic dicarboxylic acids. This was attributed to the glass transition of this composition being above room temperature, as shown on Table 1.

Comparative Example 2 (CEx. 2)

Example 1 was repeated but this time Griltex™ 1939E copolyester was extrusion coated on the IPET side of the 36ga (9 µm) Lumirror™ PA10 film. The seal seam strengths on CPET are shown in Table 2. Seal strengths on APET are shown in Table 3. Clean peels were obtained in all cases. However, the seal strengths obtained were not higher than those reported previously in the prior art for sealable layers comprising copolyesters from aromatic/aliphatic dicarboxylic acids. This was attributed to the crystallization rate of this composition being relatively high, limiting sealability to sealing temperatures above its melting point (around 300° F.).

Summary of Examples and Comparative Examples

According to the embodiments herein, it was unexpectedly found that even though there were no differences identifiable by Fourier Transform Infra Red (FTIR) spectroscopy in the structural groups in Griltex™ 1939E, Griltex™ 6E and Griltex™ 2274E, the combination of the slow crystallizing behavior and below room temperature Tg made Griltex™ 2274E to substantially outperform the other two resins.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein in entirety by reference.

I claim:

1. A heat-sealable, peelable multilayer polyester film, comprising a heat-sealable layer and a polyester substrate layer, wherein:
   i. the heat-sealable layer comprises a polyester of at least one aromatic dicarboxylic acid, at least one aliphatic dicarboxylic acid and at least one aliphatic diol;
   ii. a sample of the heat-sealable layer has a heat of fusion of in a range of about 0.32 J/g to about 0.96 J/g measured on a differential scanning calorimeter upon second heating of the sample at a controlled heating rate of 10° C./min after the sample has undergone a first heating at 10° C./min going from 23° C. to 200° C. in order to completely melt the sample and then cooling back to 23° C. by exposing the sample to ambient conditions, and the heat-sealable layer has a glass transition temperature lower than 80° F. and a melting point 250-320° F.;
   iii. the heat-sealable layer attains a seal strength of 2.5 lb/in or higher at a sealing temperature range between 250-420° F.; and iv. the heat-sealable layer has an amorphous character that enables the heat-sealable layer to flow and seal onto the polyester substrate layer even below the melting of the heat-sealable layer.

2. The heat-sealable, peelable film according to claim 1, wherein the heat-sealable layer has the glass transition temperature of lower than 50° F.

3. The heat-sealable, peelable film according to claim 1, wherein the aromatic dicarboxylic acid comprises terephthalic acid, isophthalic acid or combinations thereof.

4. The heat-sealable, peelable film according to claim 1 wherein the aliphatic dicarboxylic acid comprises sebacic acid, azelaic acid, adipic acid or combinations thereof.

5. The heat-sealable, peelable film according to claim 1 wherein the aliphatic diol comprises ethylene glycol, butylene glycol, hexanediol or combinations thereof.

6. The heat-sealable, peelable film according to claim 5, wherein the polyester substrate layer comprises a skin layer comprising a copolyester of ethylene glycol with about 18 mole % isophthalic acid and about 82 mole % terephthalic acid.

7. The heat-sealable, peelable film according to claim 1, wherein the polyester comprising the heat sealable extrusion-coated layer comprises methylene groups, —COO— ester groups, aromatic —CH=CH— groups, or combinations thereof.

8. The heat-sealable, peelable film according to claim 1, wherein the polyester substrate layer comprises silica antiblock particles.

9. The heat-sealable, peelable film according to claim 8, wherein the polyester substrate layer comprises a skin layer comprising a copolyester of terephthalic acid with about 33 mole % 1,4-cyclohexane dimethanol and about 67 mole % ethylene glycol.

10. The heat-sealable, peelable film according to claim 1, wherein the polyester substrate layer comprises a skin layer comprising a polyethylene(terephthalate-co-isophthalate) copolyester, wherein the relative molar ratios of isophthalic acid and terephthalic acid residues are in the range from 17:83 to 23:77.

11. The film according to claim 1, wherein the polyester substrate layer comprises a skin layer comprising a poly (ethylene-co-1,4 cyclohexylene-dimethylene) terephthalate, wherein the relative molar ratios of 1,4-cyclohexanedimethanol and ethylene glycol residues are in the range from 20:80 to 40:60.

12. The heat-sealable, peelable film according to claim 1, wherein the heat-sealable layer comprises an extrusion coated heat-sealable layer.

13. The heat-sealable, peelable film according to claim 1, wherein the polyester substrate layer comprises a co-extruded polyester substrate layer.

14. The heat-sealable, peelable film according to claim 1, further comprising a third polymer film layer between the heat-sealable layer and the polyester substrate layer.

15. The heat-sealable, peelable film according to claim 14, wherein the third polymer film layer comprises a diacid copolyester.

16. The heat-sealable, peelable film according to claim 1, wherein the polyester substrate layer comprises poly(ethylene terephthalate).

17. The heat-sealable, peelable film according to claim 1, wherein the heat-sealable layer is nearly amorphous.

18. A heat-sealable, peelable multilayer polyester film, comprising a heat-sealable layer and a polyester substrate layer, wherein: the heat-sealable layer comprises a polyester of at least one aromatic dicarboxylic acid, at least one aliphatic dicarboxylic acid and at least one aliphatic diol; the heat-sealable layer has a glass transition temperature lower than 80° F. and a melting point 250-320° F.; the heat-sealable layer attains a seal strength of 2.5 lb/in or higher at a sealing temperature range between 250-420° F., wherein the heat sealable layer has a thickness of about 75 μm.

19. The heat-sealable, peelable multilayer polyester film of claim 18, wherein the polyester substrate layer comprises a crystallizable polyester base layer having an amorphous polyester sealable skin.

20. A method of manufacturing a heat-sealable, peelable multilayer polyester film of claim 18, comprising
extruding the heat-sealable layer and laminating the heat-sealable layer and the polyester substrate layer.

* * * * *